No. 884,321. PATENTED APR. 7, 1908.
V. F. DAVIS.
HEAT REGULATING APPARATUS.
APPLICATION FILED JULY 5, 1906.
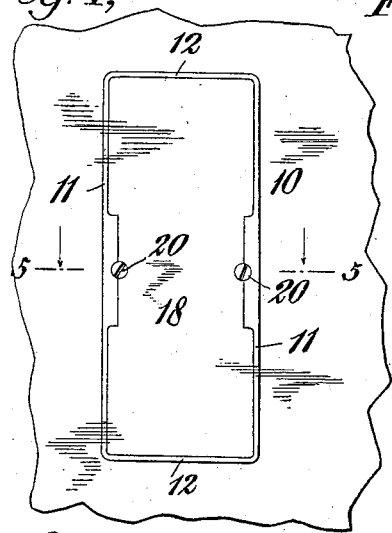
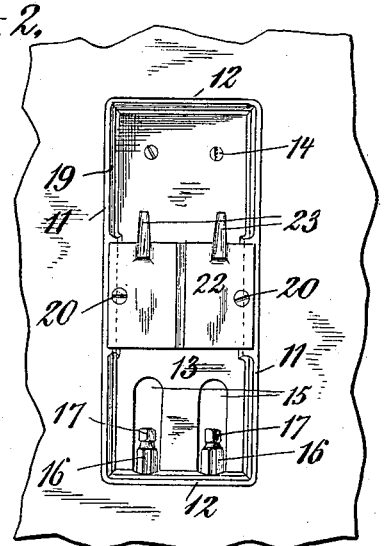
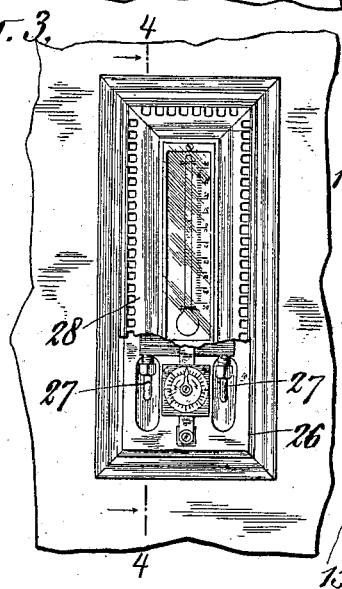
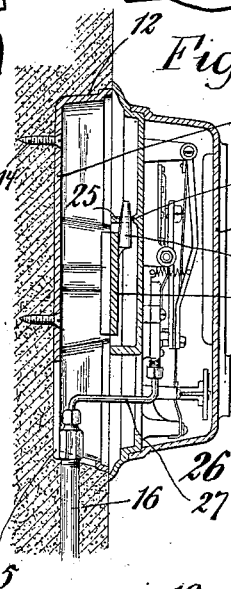
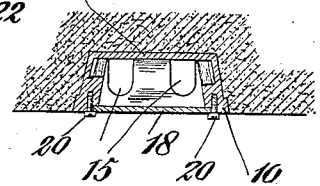
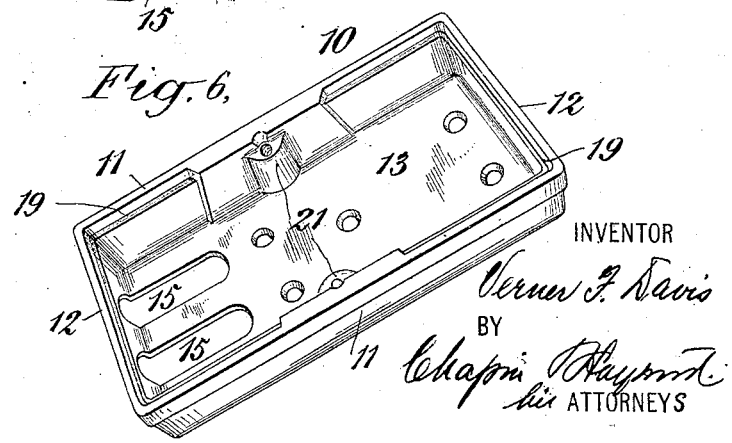
WITNESSES:
INVENTOR
Verner F. Davis
BY
his ATTORNEYS
THE NORRIS PETERS CO., WASHINGTON, D. C.

UNITED STATES PATENT OFFICE.

VERNER F. DAVIS, OF ORANGE, NEW JERSEY, ASSIGNOR TO WILLIAM B. WADSWORTH, OF PLAINFIELD, NEW JERSEY.

HEAT-REGULATING APPARATUS.

No. 884,321.     Specification of Letters Patent.     Patented April 7, 1908.

Application filed July 5, 1906. Serial No. 324,754.

*To all whom it may concern:*

Be it known that I, VERNER F. DAVIS, a citizen of the United States of America, and a resident of Orange, county of Essex, State of New Jersey, have invented certain new and useful Improvements in Heat-Regulating Apparatus, of which the following is a specification, reference being had to the accompanying drawings, forming a part thereof.

My invention relates to improvements in heat regulating apparatus, and particularly to means designed for the regulation of the temperature of rooms, halls, buildings and the like. In such forms of heat regulating apparatus the thermostatic regulator is usually arranged on one of the walls, connected by suitable pipe connections with the heating means to be controlled at another point. The pipes are usually embedded in the wall, so as to be concealed from view, and suitable means must be provided for connecting the ends of the pipes with the thermostatic device both in first setting up the apparatus and in providing for later removal, repairs, and so forth. Again, it is advantageous to provide a means to which the thermostatic instrument may be readily secured, as much difficulty has been experienced in the past in securing the instrument in position, owing to the various natures of the wall construction which do not ordinarily lend themselves readily thereto. Still further, it is advantageous to have a space at the back of the instrument when the same is set in position on the wall, in which the various pipe connections, couplings, and so forth, may be received, thereby permitting an instrument to be made which will project to a minimum distance from the face of the wall, while allowing plenty of room to work, and, again, it is advantageous to leave such a space in which the ends of the main conduits or pipes may terminate during the time the plastering is being effected, so as to prevent the ends of the pipes from being clogged with plaster or damaged in any way. With these different ends in view, I have constructed a box, arranged to be set into the wall, with the outer edge thereof flush with the surface of the wall, the said box having openings therein for receiving the ends of the main conduits or pipes, and provided with a flush cover which may be temporarily employed to close the same while the plastering and other work is being done, which cover may be removed when the instrument is to be set in place, an attaching device being substituted for the cover, to which attaching device the thermostatic regulator may be readily connected in place and as readily removed, the said open space within the box leaving free passage for effecting the coupling of the device to the main pipes or conduits and also receiving parts of said couplings.

In order that my invention may be thoroughly understood, I will now proceed to describe an embodiment thereof as illustrated in the accompanying drawings, and will then point out the novel features in claims.

In the drawings: Figure 1 is a face view of a portion of a wall with a wall box set therein and a cover in position thereon; the view illustrating the condition of the parts before the thermostatic device is placed in position. Fig. 2 shows a similar view with the cover removed, and an attaching device for the thermostat secured in position; this view showing the interior of the box and the ends of the main pipes or conduits with temporary conduits thereon. Fig. 3 is a similar view, showing the thermostatic device in position, a portion thereof being broken away to show the pipe couplings. Fig. 4 is a longitudinal section substantially upon the line 4—4 of Fig. 3 through the wall box and thermostat, when the latter is in position and connected with the main pipes or conduits. Fig. 5 is a central transverse sectional view through the wall box and cover, as it appears in Fig. 1, the plane of section being upon the line 5—5 of Fig. 1. Fig. 6 is a perspective view of the wall box removed.

Referring to the drawings by reference characters, 10 designates a wall box composed of sides 11, ends 12 and a back 13. This box is designed to be set into a wall, as shown in the drawings, and secured in position by screws 14, or by the adherence of the plaster thereto, or both. One of the end walls 12 and a portion of the back 13 is cut away to form openings 15, 15 for receiving the ends of the main pipes or conduits 16. When these main pipes or conduits and the wall box are first placed in position, temporary caps 17 are preferably employed which will close the ends thereof, and a flush cover 18 is suitably set into a recessed or rabbeted portion 19 of the box 10, the said plate being secured in position by means of screws 20, which are tapped into lugs 21 with which the box is provided.

It will be apparent that, with the cover 18 in position, the interior of the box 10 is entirely closed, so that no dirt, dust or foreign matter can lodge therein, nor can the pipe 16 be damaged in any way. It will also be apparent that, as everything exposed is flush with the face of the wall, there will be no hindrance to any treatment required to be given to the wall, such as decoration of any kind, papering or the like.

When it is desired to place the thermostatic device in position, the screws 20 are taken out and the cover 18 removed. A plate 22 is then substituted for the cover 18, the same screws 20 being employed as were used for securing the cover 18 in position, the screw openings for the plate 22 being designed to be in register with the tapped openings in the lugs 21. The plate 22 is provided with two uprising lugs 23, which are arranged to register with openings 24 in ribs 25 of the thermostatic device 26. To place the thermostatic device in position after the plate 22 has been put in place, it is only necessary to hook the same on to the lugs 25, the said lugs acting to hold the thermostatic device firmly against accidental movement, and, furthermore, being slightly tapered, as shown, will tend to draw the thermostatic device firmly against the wall with a slightly wedging action. After the thermostatic device has been thus put in position, couplings 27 preferably comprising small portions of flexible pipe may be employed to connect certain parts thereof with the main pipes or conduits 16, the temporary caps 17 having been previously removed. The thermostatic device is provided with a removable portion 28 to permit free access to the parts for this purpose.

From the foregoing it will be seen that, in a new building, the various boxes may be set in position and covers put thereon, and the parts so left until the building is entirely completed. The thermostatic devices may be then quickly set in position without defacing the walls, and with the assurance that they are properly supported and held in place. This will avoid the possibility of the instruments (which, by their very nature are extremely delicate) being damaged while the men are working on the completion of the building, and, as before set forth, it will insure the pipes or conduits 16 being clear and free, and of there being plenty of room for making the proper connections between same and the thermostatic device.

What I claim is:

1. The combination with a thermostatic regulator, of a wall box arranged to be set into a wall with its outer edge substantially flush therewith, said box having an opening therein through which a pipe within the wall may freely protrude into the said box, means for removably securing the thermostatic regulator to the said wall box, and independent connecting means comprising removable couplings for connecting the thermostatic regulator with the said pipe.

2. A wall box arranged to be received within the wall of a building and having side walls, end walls and a back, the outer edges of the side and end walls arranged substantially in a plane, whereby the said box may be set within the said wall with its edges flush with the surface thereof, said box having a recessed or rabbeted portion for receiving a temporary flush cover, and also provided with means whereby a thermostatic regulator may be secured thereto.

3. The combination with a thermostatic regulator, of a wall box arranged to be received within the wall of a building and having side walls, end walls and a back, the outer edges of the side and end walls arranged substantially in a plane, whereby the said box may be set within the said wall with its edges flush with the surface thereof, said box having a recessed or rabbeted portion for receiving a temporary flush cover, and having an opening therein through which a pipe within the said wall may freely protrude to the interior of said box, means for securing the thermostatic regulator to the said wall box, and independent connecting means for connecting the thermostatic regulator with the said pipe.

4. In a heat regulating apparatus, the combination with a wall box arranged to be received within the wall of a building and having openings 15 through which pipes within the wall may freely protrude and provided with a rabbeted or recessed portion 19 for receiving a temporary flush cover, of a bridge plate 22 adapted to be secured to the opposite side walls of the box, said plate provided with uprising lugs 23, a thermostatic device 26 provided with openings 24 arranged to register with the said lugs 23, whereby the said device may be removably attached to the wall box, and coupling elements 27 for coupling the thermostatic device directly to the said pipe independently of the connection of the thermostatic device with the wall box.

In witness whereof, I have hereunto set my hand, this 21st day of June, 1906.

VERNER F. DAVIS.

Witnesses:
W. WADSWORTH,
D. HOWARD HAYWOOD.